(No Model.)

H. KELSEY.
CREAMING CAN.

No. 317,544. Patented May 12, 1885.

WITNESSES
C. W. Dashiell.
E. G. Siggers.

INVENTOR
Henry Kelsey.
by C. A. Snow & Co.
Attorneys

UNITED STATES PATENT OFFICE.

HENRY KELSEY, OF CONCORDIA, KANSAS.

CREAMING-CAN.

SPECIFICATION forming part of Letters Patent No. 317,544, dated May 12, 1885.

Application filed August 12, 1884. (No model.)

*To all whom it may concern:*

Be it known that I, HENRY KELSEY, a citizen of the United States, residing at Concordia, in the county of Cloud and State of Kansas, have invented a new and useful Improvement in Creaming-Cans, of which the following is a specification, reference being had to the accompanying drawings.

My invention relates to creaming-cans; and it has for its object to provide improved means for cooling the milk and carrying off the animal gases from the same, and to provide the cover with a ventilator and hinged cap.

A further object of the invention is to provide a creaming-can which shall be cheap and simple in its construction, effective in its operation, and one that will be strong and durable.

The invention consists in the improved construction and combinations of parts hereinafter fully described, and pointed out in the claims.

Figure 1:
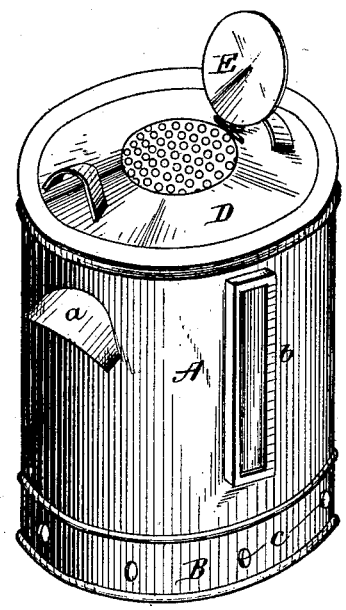
Figure 2:
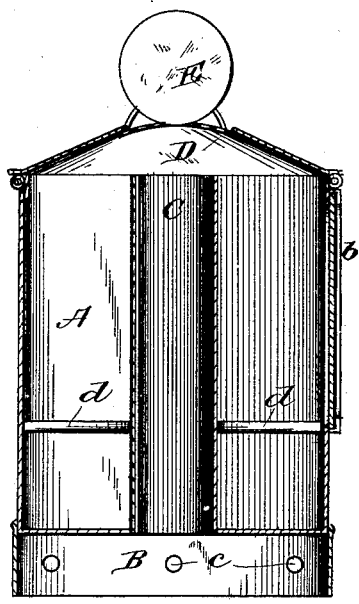

In the drawings, Figure 1 is a perspective view of a creaming-can constructed in accordance with my invention. Fig. 2 is a transverse vertical section.

In the accompanying drawings, in which like letters of reference indicate corresponding parts in both the figures, A represents the can, having handles *a* and a gage, *b*, for determining the quantity of cream in the can.

B represents a flange, which extends downwardly below the bottom of the can. This flange B may be a part of the body portion of the can, or it may be made separate therefrom and secured thereto, as is preferable. This flange is provided with a series of holes or openings, from which it will be seen that when said can is resting upon the floor the bottom will be elevated from the floor and air may pass through the openings *c*.

C represents a pipe or tube, located with the can A and extending vertically the entire length of the same. Said tube is secured to the bottom of the can at its lower end, and said bottom has an opening which communicates with the said tube. The pipe or tube C is braced against any movement whatever by means of rods *d*, which are secured to said pipe or tube at one end, and to the inner sides of the can at their other ends.

D represents the cover, which is provided with a hole or opening at about its center, said hole or opening being closed by wire-netting or a perforated disk.

E represents a cap, which is hinged to the top of the cover, and which is adapted to close the opening in the same when so desired.

The operation is as follows: The milk is placed in the can and the same set in a cool place. The air passes through the openings in the bottom flange, and from there up through the pipe or tube, thus carrying off animal gases and the hot air in the can. When desired, the can may be set in water. In this case the water will rise in the tube and cool the milk. In winter, when it is desired to keep the milk warm in order that the cream will set, the hinged cap is closed, which shuts off the draft or passage of air through the pipe or tube.

It will be seen that a creaming-can constructed as above described is simple, effective in its operation, and cheap. It will also be seen that by its use a continual current of air passes through the can, and thus cools the milk and removes all animal gases.

I am aware that it is not broadly new to provide a creaming-can with a flange having openings and extending below the bottom of the can.

I am also aware that a central tube has been employed, and that a cover having a hinged lid is not broadly new; but, Having fully described my invention, what I claim as new, and desire to secure by Letters Patent, is—

The herein-described improved creaming-can, having the removable bottom flange having a series of holes or openings, a tube, C, fitting over an opening in the bottom of the can, braces *d*, for supporting said tube, and a removable cover provided with an opening covered with netting, and a cap, E, hinged to said cover.

In testimony that I claim the foregoing as my own I have hereto affixed my signature in presence of two witnesses.

HENRY KELSEY.

Witnesses:
S. P. McCRARY,
J. S. BEACH.